No. 635,285. Patented Oct. 24, 1899.
S. M. ADAMS.
CULTIVATOR.
(Application filed Aug. 10, 1898.)
(No Model.)
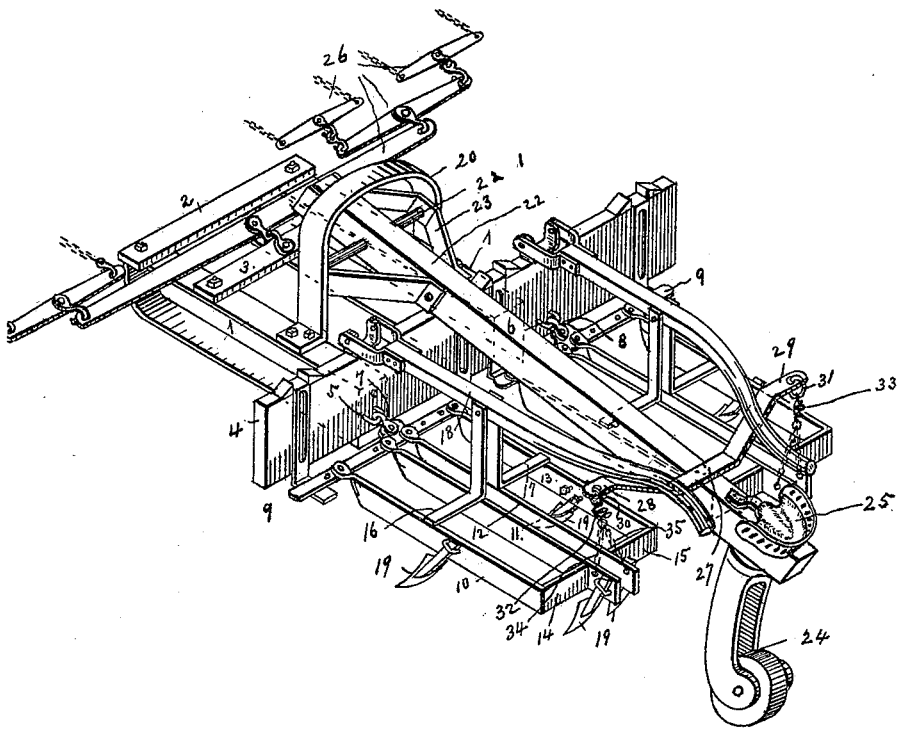
WITNESSES
H. N. Jenkins
W. L. Simmonds
Samuel M. Adams
INVENTOR
By Stoddart & Co.
Attorneys
THE NORRIS PETERS CO., PHOTO-LITHO., WASHINGTON, D. C.

UNITED STATES PATENT OFFICE.

SAMUEL M. ADAMS, OF POWHATTAN, KANSAS.

CULTIVATOR.

SPECIFICATION forming part of Letters Patent No. 635,285, dated October 24, 1899.

Application filed August 10, 1898. Serial No. 688,232. (No model.)

*To all whom it may concern:*

Be it known that I, SAMUEL M. ADAMS, a citizen of the United States, residing at Powhattan, in the county of Brown and State of Kansas, have invented new and useful Improvements in Cultivators, of which the following is a specification.

This invention relates to improvements in that class of cultivators for which Letters Patent were granted me on the 18th day of March, 1898, No. 600,275; and my present improvements consist, first, in providing the sled portion of the implement with an arched frame and in pivotally connecting therewith the forward end of a riding frame or pole, the rear portion of which is provided with a spring-seat and a supporting wheel or caster, as hereinafter set forth.

My improvements further consist in the combination, with the riding-frame and cultivator-frames, of means whereby the rear ends of the cultivator-frames are held above the surface of the ground when not required for use or supported at such level as the operator may deem best for the accomplishment of the best results when operating in the field.

The invention also consists in certain details of construction and arrangement of parts, all of which are hereinafter fully described and specifically claimed.

Referring to the accompanying drawing, the apparatus is provided with a sled-frame consisting of a pair of runners 1 1, which are held at suitable distance apart by cross-bars 2 3 and a rear plate or board 4, the latter arranged on edge and of such length as to project at each side of the sled. To the rear side of the board 4 are secured staples or eyes 5 6, which are adapted to be engaged by the hooks 7 8 of a pair of cultivator-frames. The said frames are each composed of a forward cross-bar 9, to which are adjustably secured the rearwardly-projecting bars 10 11 12 13. The rear ends of the outer bars 10 13 are connected, respectively, by right-angle bars 14 15 with the inner bars 11 12, and each pair of rectangular frames thus made are in turn connected by right-angle bars 16 17, to the upper ends of which are pivoted the handle-bars 18, as shown. The handle-bars 18 have their forward ends pivoted to the board 4, so as to serve the double purpose of guiding the cultivators and of depressing the same as occasion may require. The cultivator-points 19 are secured to the rearwardly-projecting bars of the cultivator-frames in any well-known manner.

On the sled-section of the implement an arch 20 is erected, and within said arch is fitted a horizontal rod 21, to which is connected the forward end of a trailer or riding-pole 22, having side irons 23. The rear end of the riding-pole is supported on a pivot wheel or caster 24, which is adapted to follow in the central furrow, over which the machine operates. A spring-seat 25 is fitted on the rear end of the riding-pole, so that the party seated therein may rest his feet on the bars 15 15 of the cultivator-frames.

It is proposed to operate this implement with four draft-animals, and for this purpose a system of single and double trees 26 are connected with the forward part of the sled, as shown in the drawing.

The trailer or riding-pole is provided with a frame 27, having outwardly-extended arms 28 29 to receive the rings 30 31 of coil-springs 32 33, the lower ends of which are connected, respectively, with chains 34 35, the ends of which are secured to the adjacent central bars 11 12 of their respective cultivator-frames, so as to hold the cultivator-points above the surface of the ground except at such times as the driver shall depress the handles thereof.

Having described my invention, what I claim as new, and desire to secure by Letters Patent, is—

The combination in a cultivator, of a sled, an arched frame secured to the runners of said sled, a rod connecting the legs of the arched frame and a riding-pole journaled on said rod; the rear end of the riding-pole provided with a spring-seat and a supporting-caster, as described, with a pair of cultivator-frames, each cultivator-frame composed of a horizontal front bar and four rearwardly-projecting parallel bars, the parallel bars arranged in pairs and connected by right-angle bars with handle-bars, the cultivator-frames and forward end of each handle-bar pivotally connected with the sled, as and for the purpose set forth.

In testimony whereof I have hereunto set my hand this 9th day of July, A. D. 1898.

SAMUEL M. ADAMS.

Witnesses:
C. M. MOORE,
W. R. SHUMATE.